Nov. 6, 1956  H. V. ELLIOTT  2,769,352

ROD CONTROLLING MECHANISM

Filed July 26, 1952

INVENTOR.
HAROLD V. ELLIOTT
BY
Willits, Hardman & Fehr
His ATTORNEYS

United States Patent Office 2,769,352
Patented Nov. 6, 1956

2,769,352

ROD CONTROLLING MECHANISM

Harold V. Elliott, Anderson, Ind., assignor to General Motors Corporation, Detroit, Mich., a corporation of Delaware Application July 26, 1952, Serial No. 301,057

4 Claims. (Cl. 74—503)

This invention relates to improvements in controlling mechanism for heaters, valves and other remote controlled parts.

An object of the present invention is to provide a novel and improved friction detent device for yieldably holding one member in a predetermined position relatively to another. This object is accomplished by the use of a nylon insert adapted to be held by one of said members, said insert having at least one yieldable portion thereon in proximity to the other member, and said yieldable portion is provided with a detent integral with the yieldable portion which cooperates with latch means carried by the other member and adapted to cooperate with said detent for yieldably positioning one of said members relative to the other.

Another object of the present invention is to provide a novel and improved friction insert having an embossed portion which provides sliding friction at a plurality of points in the adjustment of the rod, and operates as a yieldable detent at other points in the adjustment of the rod.

Another object of the present invention is to provide a rod provided with a knob or handle, and an insert of plastic material in which the rod is received so as to be capable of free longitudinal movement therein and when the rod is moved longitudinally in the insert and the controlled part thereby adjusted to the desired position the rod will be frictionally clamped in position by the insert.

Another object of the present invention is to provide a one-piece molded insert of deformable tough and wear resistant plastic material in which a rod is received and which is capable of free movement therein to a plurality of adjusted positions, on being moved in either direction of longitudinal movement the insert coacts with the rod and when the rod is moved to a certain adjusted position the rod is frictionally clamped in said position by the insert so as to prevent movement of the rod when the rod is released. This object is accomplished by having the rod provided with a plurality of perimetrical grooves and having the rod extending through the insert, said insert having a key portion coacting with a longitudinal groove to guide the rod in a straight line and having the insert provided with bosses for engagement with the perimetrical grooves to hold yieldingly the rod in a selected controlling position.

Further objects and advantages of the present invention will be apparent from the following description, reference being had to the accompanying drawings wherein a preferred embodiment of the present invention is clearly shown.

Figure 1:
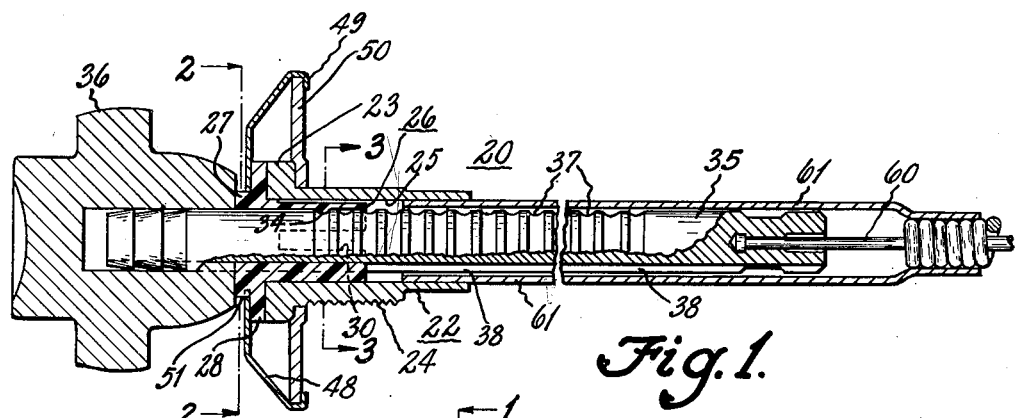
Fig. 1 is a longitudinal sectional view of a controlling mechanism embodying the present invention and taken on line 1—1 of Fig. 2.
Figure 2:
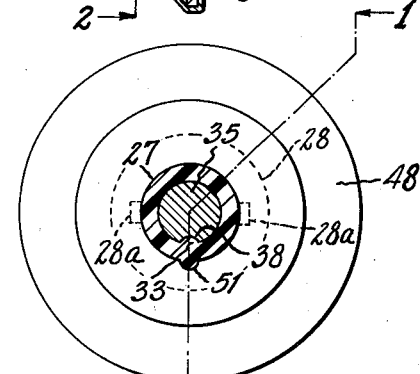
Fig. 2 is a sectional view taken on line 2—2 of Fig. 1.
Figure 3:
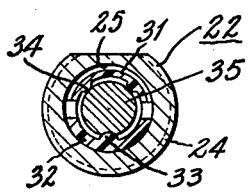
Fig. 3 is a sectional view taken on line 3—3 of Fig. 1.
Figure 4:
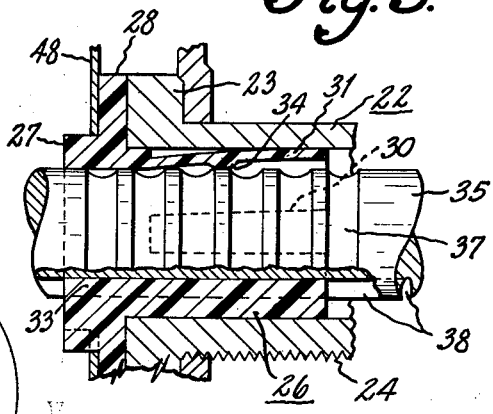
Fig. 4 is a detail in section showing the control rod in an unlocked position.

Referring to the drawings, 20 designates a control mechanism adapted to be mounted in an instrument panel having an opening provided with a flat side in which an outer supporting member or tubular fitting 22 is mounted. The fitting 22 is provided with a flange 23 at the left end thereof as viewed in Fig. 1. The fitting 22 has external threads 24 adapted to receive a clamping nut not shown. The fitting 22 has a flat side which will register with the flat side in the opening in the panel so that the fitting 22 cannot turn relative to instrument panel.

The tubular support or fitting 22 is formed with an opening 25 which is adapted to receive a sleeve or insert 26, made of deformable, tough and wear resistant plastic material, for example "nylon." The insert 26 is molded with special formations so that one end thereof can be inserted in the opening 25 of the fitting 22. In this instance the insert is a one-piece molded sleeve provided with a relatively small tubular portion 27, a collar or shoulder 28, and a relatively long tubular portion 29 having end slots 30 formed therein to provide tines or semi-cylindrical portions 31 and 32, the portion 31 is less in cross dimension than portion 32 as shown, so as to be yieldable or springable. The insert is formed with an integral key or lug means 33. In this instance the key means project inwardly from the portion 32. The portion 31 is provided with inwardly extending detents or bosses 34 which are preferably spherical as illustrated.

Figure 5:
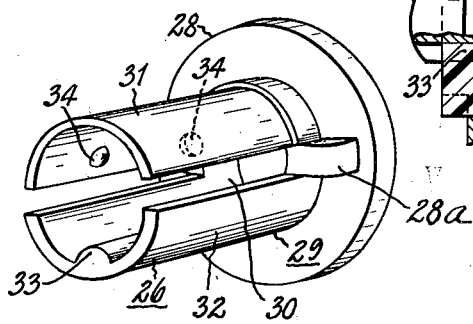
Fig. 5 is a perspective view of the improved insert.

To retain the insert 26 against rotation within the fitting 22, the collar 28 is preferably formed with retaining projections 28a, see Fig. 5, which in assembly are received within complementary keeper sockets in the collar 23.

The structure of the insert 26 as illustrated is designed to form a split tube portion at one end which is adapted to embrace a rod or actuator and the insert is capable of exerting a contractible force on the rod, but it is pointed out that it will require sufficient manual force to move the rod through the insert 26 to various positions.

The rod or adjusting member 35 passes through the insert 26 and is provided with a handle or grip 36, at the left end thereof. The rod has an irregular surface or a plurality of perimetrical grooves 37 and a flute or longitudinal groove 38. The rod 35 slides freely in the insert 26, but when the rod is stationary the rod is frictionally held from sliding by the clamping effect of the portion 31 which has a spring-like action which permits it to yield somewhat by pressure. The groove 38 cooperates with the key means 33 to prevent rotating movement of the rod, and the grooves coact with the bosses 34 to provide a plurality of predetermining axial positions with respect to the insert 26.

The insert 26 is held in assembled relation with the tubular support member 22 by any suitable means. In the present instance a finishing apertured plate 48 is used which surrounds the small tubular portion 27 and engages the front face of the collar 28. The peripheral edge of the plate 48 has its periphery spun over at 49 over the circumferential edge of an apertured mounting plate 50 which embraces the fitting 22 and engaged behind the flange 23. By this arrangement the collar of the insert 26 is held in abutting engagement with the flange 23 to maintain the insert within the tubular support 22. The small tubular portion 27 of the insert has an integral lug 51 extending radially outward therefrom and coacts with a notch in the finishing plate 48 to prevent rotative movement of the insert 26 within the fitting 22. The right end of the rod 35, as viewed in Fig. 1, is provided with a short axial bore within which a controlling wire 60 may be inserted and the end contracted or deformed to fix the wire 60 tightly to the rod. The fitting 22 carries a tubular housing 61 for the control rod. The right end of the housing 61 is contracted upon one end of a spirally wound conduit which houses the wire that is attached to a part to be controlled.

The operation of the detent device as illustrated is as follows: When the rod is pushed or pulled in its wide range of movement the yieldable portion 31 possesses sufficient resiliency to permit it to move outwardly when the bosses 34 are engaged by the portions of the rod between the grooves and to cause the bosses 34 to snap back into the grooves as the grooves come opposite the bosses thereby serving to retain the rod in position. However, where it is required to use a control for regulating a device that requires more force to move the rod the shape of the larger tubular portion 29 may be modified to eliminate the slots 30. By such a structure a slight increase in manual force will be required to push or pull the rod through the insert or sleeve past the bosses 34. In such structure that portion of the insert which carries the bosses 34 will possess sufficient resilience to bulge outwardly when the bosses are engaged by irregular portions of rod between the grooves and to cause the bosses to snap back into the grooves as the grooves come opposite thereby serving to hold the rod in position. It is believed, however, that such a modification will be understood by those skilled in the art and such structure is not illustrated herein.

While the embodiment of the present invention as herein disclosed, constitutes a preferred form, it is to be understood that other forms might be adopted.

What is claimed is as follows:

1. A control device comprising a tubular fitting, a nylon tube supported within the fitting, having a collar at one end thereof adapted to engage one end of the fitting and having a portion projecting beyond the collar thereof and extending into the fitting, said projecting portion having a slot therein to provide a yieldable portion, a detent on said yieldable portion, a longitudinally extending key on an internal portion of said tubular insert, an operating rod provided with annular grooves and a longitudinal groove extending through said tube, said longitudinal groove receiving the key whereby the rod is prevented from rotating relative to said tube and said detent cooperating with said annular grooves that retain yieldably the rod in a longitudinal adjusting position, and means for holding the collar of said tube and the said end of the said fitting in engagement.

2. A control device comprising, a tubular fitting, a tough, wear-resistant plastic tube supported within said fitting, having a collar at one end thereof adapted to engage one end of the fitting and a portion extending into the fitting, said portion which extends into the fitting having a yieldable portion, a detent means associated with said yieldable portion, an operating rod having engaging means spaced longitudinally thereof extending into said tube, said detent means being aligned with engaging means of said rod and cooperating therewith to retain yieldingly the rod in a longitudinal adjusted position, locking means for holding the collar of said plastic tube non-rotatable with respect to said fitting and means for holding the collar of said plastic tube in engagement with the said end of said fitting.

3. A controlling device comprising in combination a tubular fitting having a flange on one end thereof, a tough, wear-resistant plastic insert having a collar on one end thereof, said insert being confined within said fitting, and said collar and flange being in abutting contact, locking means associated with said collar and said flange for holding said fitting non-rotatable with respect to said insert, said insert being formed with a yieldable extension having at least one projection, and a control rod having aligned depressions spaced longitudinally thereof and being slidably mounted for longitudinal movement with the said insert, said projection cooperating with the depressions of said rod for yieldably retaining said rod in a longitudinal adjusted position.

4. A positioning device comprising in combination, a tough, wear-resistant plastic tubular member having a collar at one end thereof and a yieldable portion, an inwardly extending detent associated with said yieldable portion, a tubular support embracing said plastic member and having a flange at one end thereof engaging the collar of said plastic member, a control rod having aligned depressions spaced longitudinally thereof embraced by said plastic member and being longitudinally slidable therein, said detent being aligned with the depressions of said rod and cooperating therewith to retain yieldingly the rod in a longitudinal adjusted position, means associated with said plastic member and said rod for holding the rod non-rotatably within said plastic member, means associated with said plastic member and said tubular support for holding said plastic member non-rotatably within said tubular support, and means associated with the collar of said plastic member and the flange of said tubular support for holding said flange in said collar in firm engagement.

References Cited in the file of this patent

UNITED STATES PATENTS

| 1,579,234 | Newman | Apr. 6, 1926 |
| 1,652,794 | Piel | Dec. 13, 1927 |
| 1,815,631 | Olson | July 21, 1931 |
| 1,875,791 | Winning | Sept. 6, 1932 |
| 2,112,722 | Weber | Mar. 29, 1938 |
| 2,486,098 | Batterson | Oct. 25, 1949 |
| 2,509,202 | Arens | May 30, 1950 |
| 2,550,795 | Flaton | May 1, 1951 |
| 2,592,361 | Weber | Apr. 8, 1952 |

OTHER REFERENCES

Electronics, page 225, March 1952.